United States Patent
Vassilev et al.

(10) Patent No.: US 7,565,536 B2
(45) Date of Patent: Jul. 21, 2009

(54) METHOD FOR SECURE DELEGATION OF TRUST FROM A SECURITY DEVICE TO A HOST COMPUTER APPLICATION FOR ENABLING SECURE ACCESS TO A RESOURCE ON THE WEB

(75) Inventors: Apostol Vassilev, Austin, TX (US); Kapil Sachdeva, Austin, TX (US)

(73) Assignee: Gemalto Inc, Austin, TX (US)

( * ) Notice: Subject to any disclaimer, the term of this patent is extended or adjusted under 35 U.S.C. 154(b) by 771 days.

(21) Appl. No.: 11/219,466

(22) Filed: Sep. 2, 2005

(65) Prior Publication Data
US 2007/0056025 A1    Mar. 8, 2007

(51) Int. Cl.
*H04L 9/00* (2006.01)
*H04L 9/32* (2006.01)

(52) U.S. Cl. .................. 713/168; 713/173; 713/192; 726/2; 726/3; 726/4; 726/5; 726/9; 726/10

(58) Field of Classification Search .......... 713/168, 713/172–173, 189, 192–194; 726/2–5, 8–10, 726/16–21
See application file for complete search history.

(56) References Cited

U.S. PATENT DOCUMENTS

| 7,143,177 | B1 * | 11/2006 | Johnson et al. ............. 709/231 |
| 2003/0188001 | A1 * | 10/2003 | Eisenberg et al. ........... 709/229 |
| 2004/0243520 | A1 * | 12/2004 | Bishop et al. ................ 705/75 |

\* cited by examiner

*Primary Examiner*—Hosuk Song
(74) *Attorney, Agent, or Firm*—The Jansson Firm; Pehr Jansson (57) ABSTRACT

Secure authentication of a user on a host computer to a web server including a security device acquiring trust or a security context from the web server. The security device is operable of providing an X.509 certificate to a browser plug-in on the host computer. The browser plug-in on the host computer performing authentication of the security device and in response providing user credentials to the security device. The security device performing authentication of the user and requests a security context from the web server. In response, the web server provides a security context to the security device. The security device delegates the web server trust by transmitting the context to the host computer and enabling the user to securely access resources on the web server.

15 Claims, 7 Drawing Sheets

METHOD FOR SECURE DELEGATION OF TRUST FROM A SECURITY DEVICE TO A HOST COMPUTER APPLICATION FOR ENABLING SECURE ACCESS TO A RESOURCE ON THE WEB

TECHNICAL FIELD

The present invention relates generally to user authentication on the web, and more particularly, to delegation of security context acquired from a web server by a security device, to a client application on a host computer for a user on the host computer to access resources on the web.

BACKGROUND OF THE INVENTION

In the service-oriented network computing environment, a user running a client application such a browser on a host computer is typically authenticated by a web server prior to being allowed access to resources on the web server. Traditionally, the web server presents a web page on the browser of the host computer into which the user enters a user name and an associated password. Upon receiving the user name and associated password, the web server authenticates the user and returns a security context to the client application on the host computer. A security context is a data structure that contains information about authentication acts that are performed by subjects, attributes of subjects, and authorization decisions about whether subjects are allowed to access certain resources. A single security context might contain several different internal statements about authentication, authorization, and attributes. The client application on the host computer uses the security context to further access the resources on the web server.

Communication between the client application on the host computer and the web server is generally protected by network resources such as a proxy server. The proxy server ensures the integrity of the data transmitted over a secure channel in an encrypted form between the client application on the host computer and the web server. The security context sent to the client application by the web server maintains trust between the client application and the web server.

Thus, user authentication is an extremely important issue. There are several different types of techniques to acquire user authentication. One example of such a technique is username and password based authentication where a web server presents a web page on the client application of a host computer to obtain user login information such as a username and a password. The user login information is stored in the database of the web server upon successful authentication of the user. Another example of such a technique is Microsoft Passport which provides a user a mechanism to create a sign-in credential (such as an e-mail address of the user and a password) once, and then use the sign-in credential everywhere on the Microsoft Passport network. Further, the authentication context stored in the database of the above-mentioned techniques provide weak authentication as databases in general are vulnerable to attacks by malicious software.

One method of authenticating a user on a host computer is to use a network security device. One example of such a network security device is the use of a smart card. In this use of smart cards, a smart card connected to a host computer via a smart card reader, performs user authentication against credentials that are stored on the smart card, for example, during the personalization phase. Smart cards provide strong authentication such as mutual authentication based on shared secret key or Public Key Infrastructure (PKI) with cryptographic capabilities, as well as secure hardware and software.

However, traditional smart cards have inefficient communications protocols and, to communicate with other network nodes, require special drivers installed on the host computers to which they are connected. Recent advances in smart card research have made it possible to treat the smart card as a network peer. As a network peer, the smart card (a network smart card) can communicate securely with other computers on the network using standard mainstream network communication protocols like TCP/IP and SSL/TLS. Network smart cards and their use are described in greater detail in complimentary art, co-pending and co-assigned U.S. patent application Ser. No. 10/848,738, entitled, "SECURE NETWORKING USING A RESOURCE-CONSTRAINED DEVICE" of HongQian Karen Lu, Michael Andrew Montgomery, and Asad Mahboob Ali, the entire disclosure of which is incorporated herein by reference. Network smart cards may communicate securely end-to-end with remote web servers. While this improves the security of the communication between a smart card and a remote web server, the security context is established between the smart card and the remote web server. This presents a challenge in the use of network enabled smart cards in that if a user wishes to use the smart card to present the user's login credentials to a remote web server the security context is not with the application (for example, a web browser) that the user is using but rather with the smart card. Even in the use of conventional or classic smart cards, wherein the card communicates to other network nodes via a host computer to which it is attached, the problem of having to delegate trust to a host can arise, for example, where a secure channel is established between the smart card and a web server and wherein the user authentication is performed by the card. The complimentary art does not address how to use the smart card to provide a user with to authentication services to be allowed access to the services provided by a web server.

From the foregoing it will be apparent to those skilled in the art that there is a need for an improved method using a security device, such as a network smart card, using network communication protocols like TCP/IP and connected to a remote web server over the Internet, or a classic smart card connected via a secure channel to a remote web server, to allow a user to login to the remote web server by using login credentials stored on the network security device thereby taking advantage of the strong authentication available on network security devices, such as network smart cards.

SUMMARY OF THE INVENTION

In a preferred embodiment, the invention provides a method for authentication of a user on a host computer to a web server using a network security device wherein the network security device establishes trust with the web server and securely delegates trust to the host computer.

In one embodiment, the web server is operable to generate and securely transmit a security context to the network security device and to establish trust with the network security device. In this embodiment, the network security device is a smart card (for example, a network smart card) providing delegation of trust established between the web server and the network security device to the host computer. Furthermore, the host computer uses the network security device to log in to the web server and then allow the successful login to be delegated to the host computer so that the user can continue to securely access resources on the web server.

In another embodiment, the network security device is operable to establish trust with special purpose software on the host computer by transmitting an X.509 certificate of the network security device issued by the manufacturer and in response to that transmission, the network security device acquires user credentials from the special purpose software on the host computer to authenticate the user on the host computer. The special purpose software on the host computer may be a browser plug-in. Upon successful authentication of user credentials acquired from the special purpose software on the host computer by the network security device, the network security device delegates the trust by transmitting the security context to the browser plug-in on the host computer and enabling the user to securely access resources on the web server.

Other aspects and advantages of the present invention will become apparent from the following detailed description, taken in conjunction with the accompanying drawings, illustrating by way of example the principles of the invention.

DETAILED DESCRIPTION OF THE INVENTION

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

A note on terminology: throughout this document a network security device refers to a device that is using standard transport or communication protocols such as TCP/IP, has a private or a public IP address, and acts as an independent node accessible in a network environment such as Local Area Network (LAN), Wide Area Network (WAN), Intranet or Internet. One example of such devices are network smart cards, e.g., as described in the co-pending and co-assigned patent application Ser. No. 10/847,738.

I. Introduction

As shown in the drawings for purposes of illustration, the invention is embodied in a novel system and method for delegating trust of a web server to a host computer. A system according to the invention provides a network security device the ability to acquire trust of a web server and delegate the trust by establishing a secure communication between the network security device and the host computer using a X.509 certificate of the network security device issued by the manufacturer and transmitting a security context securely to the host computer.

Figure 1:
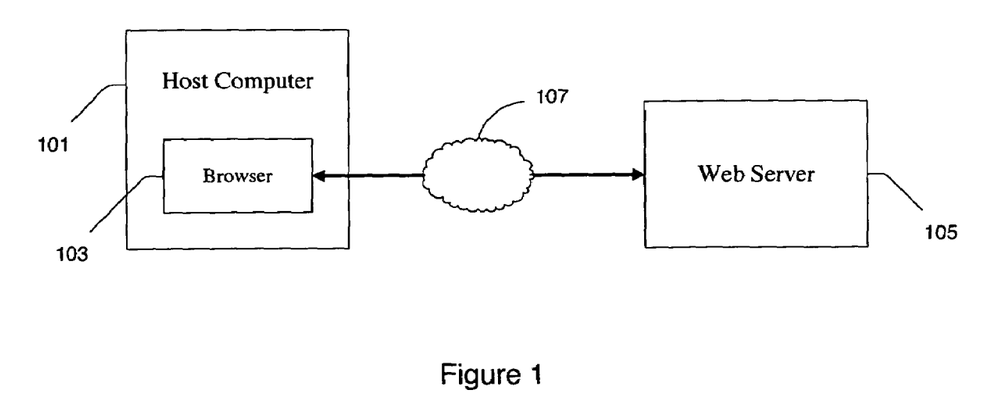
FIG. 1 is a schematic illustration of an example of a conventional network connection of a client application on a host computer with a web server for acquiring user authentication from the web server.

FIG. 1 is a schematic illustration of an example of conventional network connection of a client application on a host computer with a web server for acquiring user authentication from the web server. Secure authentication of a user on a host computer is a prominent issue in a service-oriented network computing environment. Furthermore, there is still a need for a mechanism that allows a user to use a network security device to acquire a security context from a web server and to use that security context to interact with the web server using a host computer that is separate and distinct from the network security device.

In one embodiment of the invention, a software module, e.g., a browser plug-in on a host computer, and a network security device, e.g., a network smart card, are used to transfer a security context acquired from a web server from the network security device to a host computer. Furthermore, because network smart cards do not require any smart card specific middleware or smart card reader drivers on host computers to which they are connected, the approach according to the invention provides an extremely portable way of delegating trust of the web server from a network smart card to a host computer.

Figure 2:
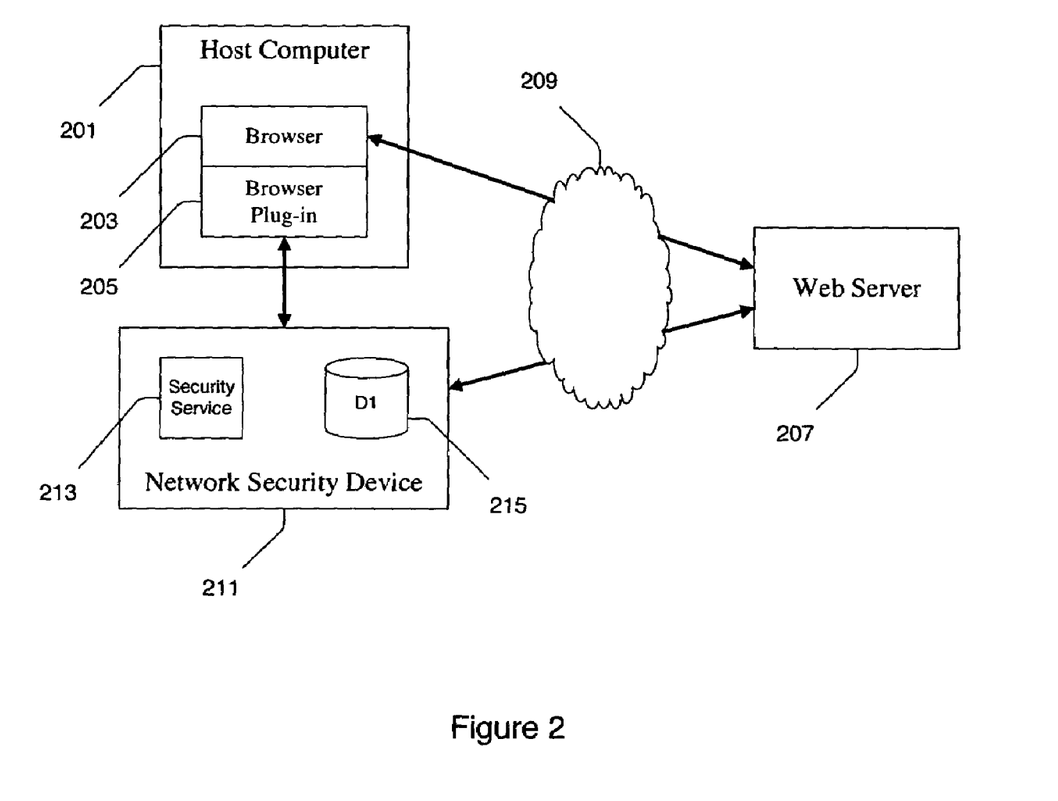
FIG. 2 is a schematic illustration of an example of a network security device for delegation of security context from a web server to a client application on a host computer.

FIG. 2 is a schematic drawing illustrating at a high level an example in which a security context of a web server is provided to a host computer according to the method of the invention. In one embodiment of the invention, the network security device is a smart card 211 (a network smart card) having thereon a software security service module 213 and a storage device 215. The security service module 213 is capable of connecting to the web server 207. In one embodiment of the invention, the web server is a web server providing secure access to resources available over the World Wide Web. The web server 207 further is capable of producing a security context, e.g. a SAML (Security Assertion Markup Language) Assertion. SAML Assertions are usually transferred from identity providers to service providers and provide information that a service provider may use to make access control decisions. For example, a SAML Assertion may be an authentication statement in which the identity provider indicates to the service provider that the user indeed has authenticated himself with the identity provider.

A user on a host computer 201 using a standard browser 203 requires an authentication context, e.g. security context produced by the web server 207 to securely access resources provided by the web server 207 over a network 209. Consider that the user may have log in credentials stored on a network security device 211 and wishes to use those security credentials to log in to the web server 207. If the user causes the network security device 211 to log in to the web server 207, the security context would be transferred from the web server 207 to the network security device 211. That would not be useful for the user who wishes to use the security context to be allowed access to resources on the web server 207 using a web browser on the host computer 201. In one embodiment of the present invention, a special software module, e.g. a browser plug-in 205, on the host computer 201 and the network smart card 211 operate to securely delegate the security context of the web server 207 from the network smart card 211 to the host computer 201. However, that implementation must only be considered as an example and not as a restriction on the claims.

II. Workflow

Figure 3:
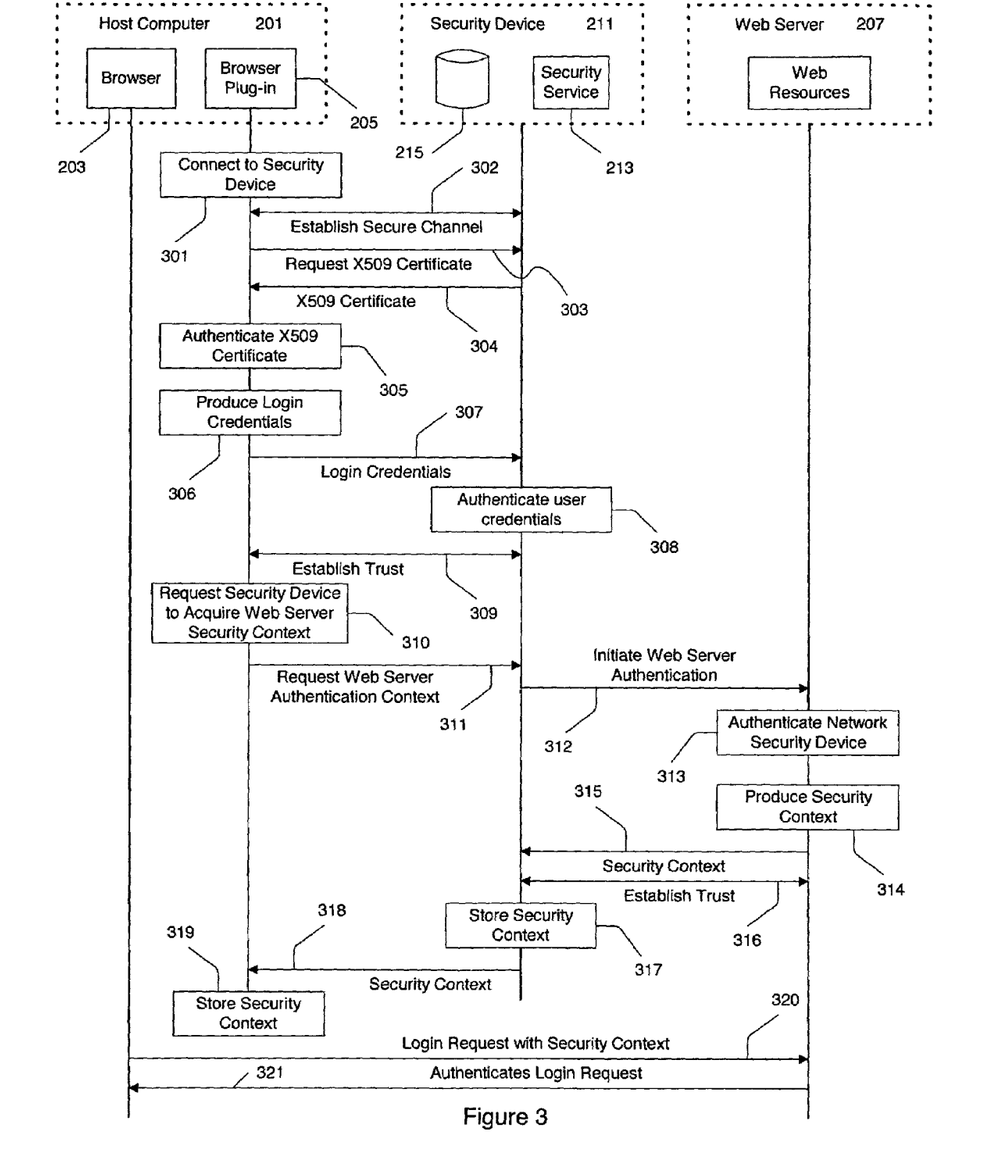
FIG. 3 is a timing sequence diagram illustrating the data flow in one embodiment of the invention and corresponding to the architecture of FIG. 2.

FIG. 3 is a timing sequence diagram illustrating the message flow in one embodiment of the invention and corresponding to the architecture of FIG. 2. The brief description provided immediately herein below is expanded upon in greater detail further below.

1. The user opens a browser 203 on the host computer 201 and connects via browser plug-in 205 to the network security device 211, step 301, to establish secure channel of communication through message traffic link 302. The host computer 201 can download the browser plug-in 205 from the network security device 211 or from the web server connected to the Internet. The browser 203 requests an X.509 certificate for the network security device 211 to establish a secure link to the network security device 211, message 303. The network security device 211 operable to providing an X.509 certificate, transmits the X.509 certificate of the network security device 211 to the browser plug-in 205, message 304. The browser plug-in 205 authenticates the X.509 certificate of the network security device 211, step 305, for example, by verifying the X.509 certificate with a certificate authority. Upon successful authentication by the browser plug-in 205 of the X.509 certificate of the network security device 211 with the certificate authority that granted the X.509 certificate, the browser plug-in 205 produces the user login credentials, step 306, e.g., the browser plug-in 205 presents the user with a login window and collects the entered username and password. The browser plug-in 205 transmits the user login credentials produced in step 306 to the network security device 211, message 307.

2. The network security device 211 authenticates the user credentials received in message 307, step 308, with the user credentials stored in the network security device 211 and establishes trust with the browser plug-in 205, link 309.

3. The browser plug-in 205 produces a request to acquire a security context from a web server 207, step 310. In one embodiment, the browser plug-in 205 may provide the URL of a web server in the request. In another embodiment, the browser plug-in 205 may display a list of web servers provided by the network security device to the user on the host computer 201 for the user to select a web server. The browser plug-in 205 transmits the request of step 310 to the network security device 211, message 311.

Figure 4:
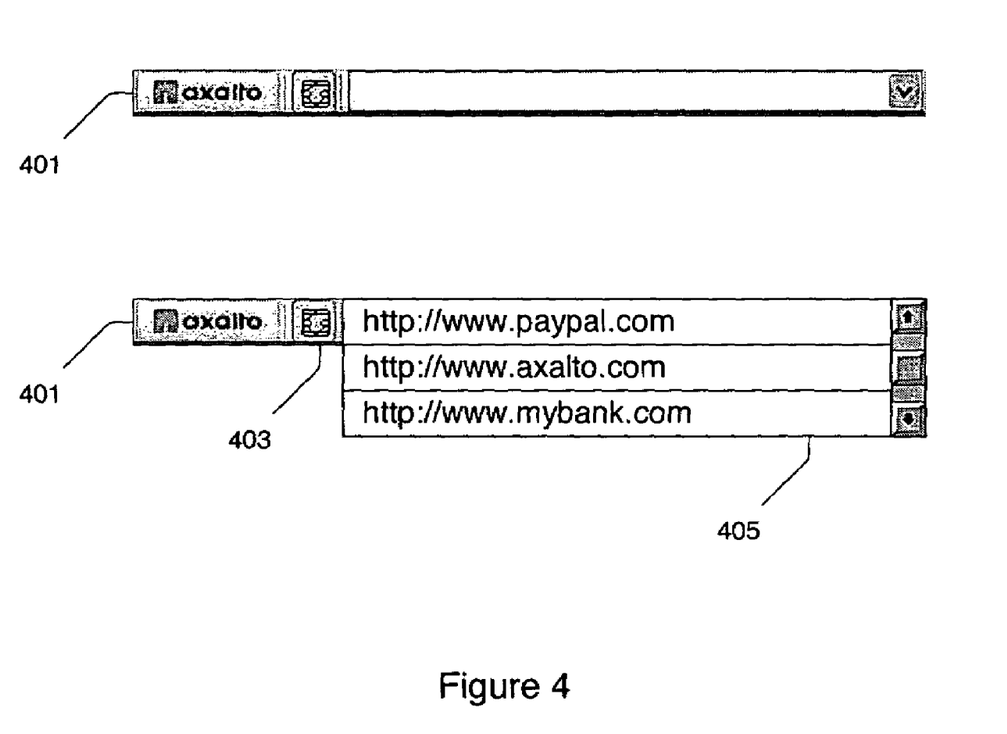
FIG. 4 is an illustration of an example of retrieving a list of web servers stored on a network security device using a browser toolbar.

4. FIG. 4 is an illustration of a toolbar 401 on the browser plug-in 205 that may be used to display a list of web servers to the user on the host computer 201. The user clicking on the logon button 403 in the toolbar 401 is prompted to enter a PIN to authenticate to the network security device. On successful validation by the network security card (a network smart card), a list of web servers stored on the network smart card as an XML file is retrieved by the toolbar 401 and displayed in the web server display 405 of the toolbar 401. Furthermore, user selects a web server from the web server display 405 and furthermore the selected web server is embedded in the request of step 310.

5. The network security device 211 capable of communicating with other remote devices on the network, produces an authentication request for the user requested web server and transmits the request to the web server 207, message 312.

6. The web server 207 authenticates the network security device 211, step 313. With the user credentials received in message 312, the web server 207 produces a security context, step 314. In one embodiment of the invention, the security context is a SAML Assertion. The web server 207 transmits the security context of step 314 securely to the network security device, message 315 and establishes trust with the network security device 211, link 316. Furthermore, the circle of trust is completed between the web server 207, the network security device 207 and the host computer 201.

7. The network security device 211 stores the security context received in message 315 in the storage unit 215, step 317. The network security device 211 transmits the security context from storage unit 215 to the browser plug-in 207, message 318.

8. The browser plug-in 207 stores the security context on the host computer 201, step 319 and accessible by the browser 203. The browser 203 on the host computer 201 makes an HTTP request containing security context of step 319 to the URL on the web server 207 that authenticates user login, message 320. In another embodiment, using a federation model, the browser plug-in 207 may acquire a security context of a web server 207 from the network security device 211 and use this security context to access secure resources of a web server other than the web server 207.

9. Upon successful authentication of the user by the web server 207, user is granted access to resources on the web server 207. A welcome screen is sent back to the browser instance 203, message 321.

With the above-described message flow, a network smart card 211 may be used to connect to a web server 207 and to provide the login credentials of a user to the web server 207 to obtain a security context. Furthermore, the network smart card 211 delegates the security context acquired from the web server 207 to the user on the host computer 201 and enables the user to access securely the resources on the web.

III. Alternate Embodiment

Figure 5:
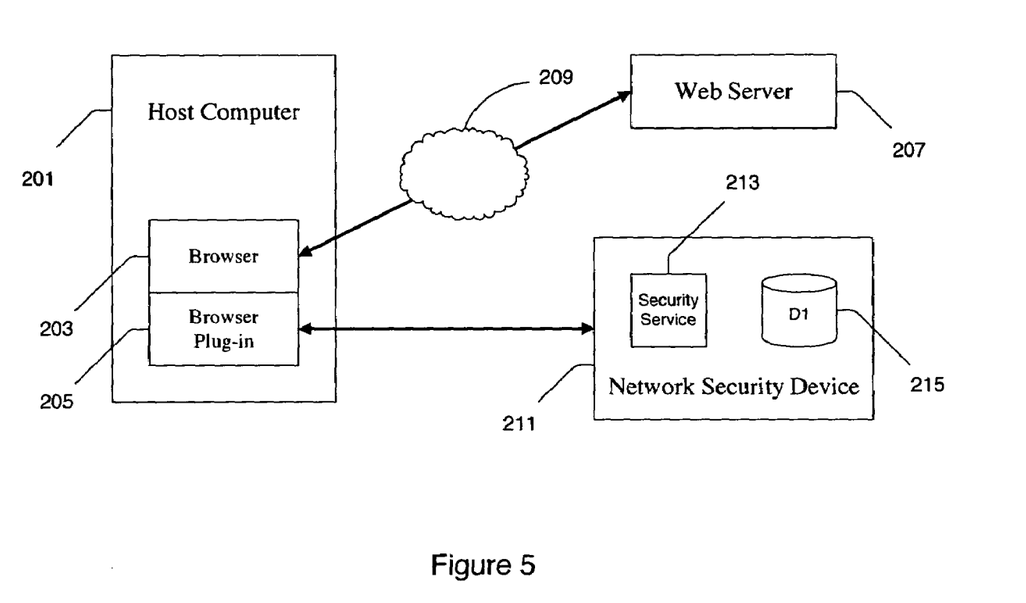
FIG. 5 is a schematic illustration of an example of a network security device for delegation of security context from a web server to a client application on a host computer wherein the network connection of the network security device is via the host computer.

An alternate embodiment of the invention described herein relies on a network security device that is a network smart card directly connected to the host computer. Furthermore, the host computer provides the network security device connectivity to the network 209 and the communication to the web server 207 as illustrated in FIG. 5. The workflow outlined in FIG. 3 applies in its entirety in reference to all the message flow to achieve the delegation of the security context generated by the web server 207 to the host computer 201.

Figure 6:
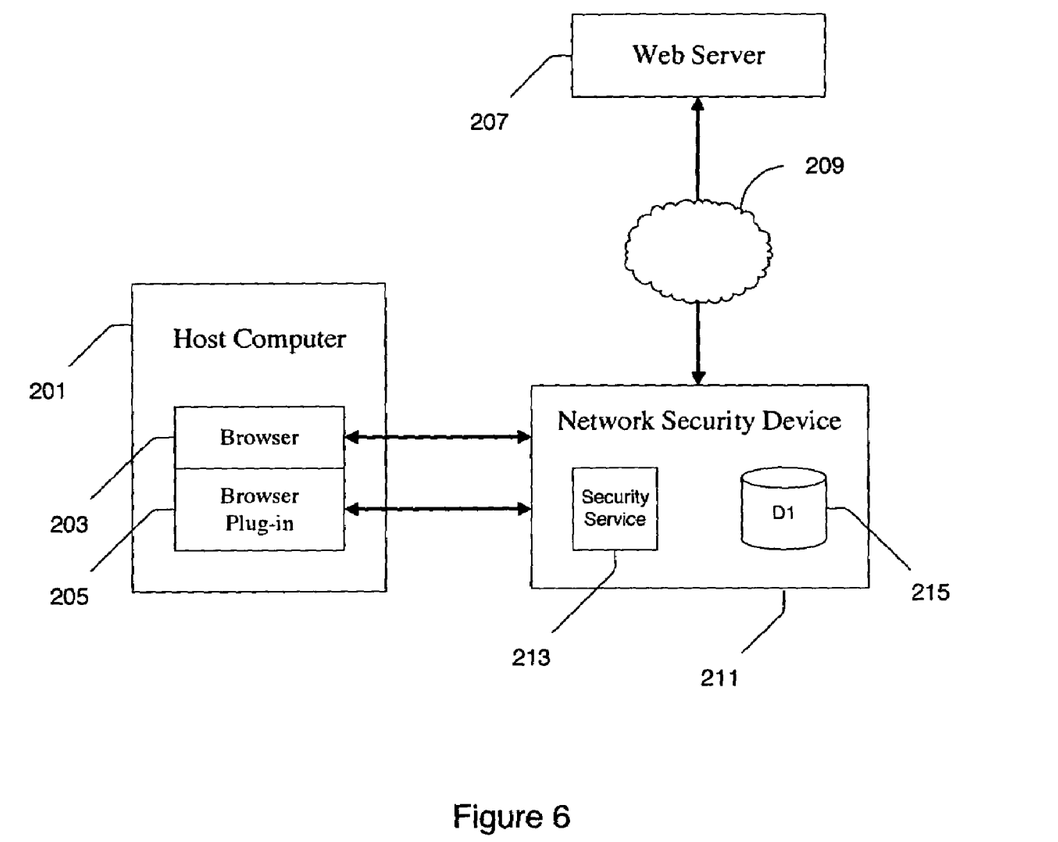
FIG. 6 is a schematic illustration of an example of a network security device for delegation of security context from a web server to a client application on a host computer wherein the network connection of the host computer is via the network security device.

Another embodiment of the invention described herein relies on a network security device that is a network smart card to provide network connectivity to the host computer. With the advancement in the technologies deployed in the network smart card, it is possible to route all of the network traffic of a host computer via the network smart card. FIG. 6 is a schematic illustration showing such a connectivity of a host computer 201 to a network smart card 211 for the host computer 201 to gain access to the network 209. The workflow outlined in FIG. 3 applies in its entirety in reference to all the message flow to achieve the delegation of the security context generated by the web server 207 to the host computer 201.

Figure 7:
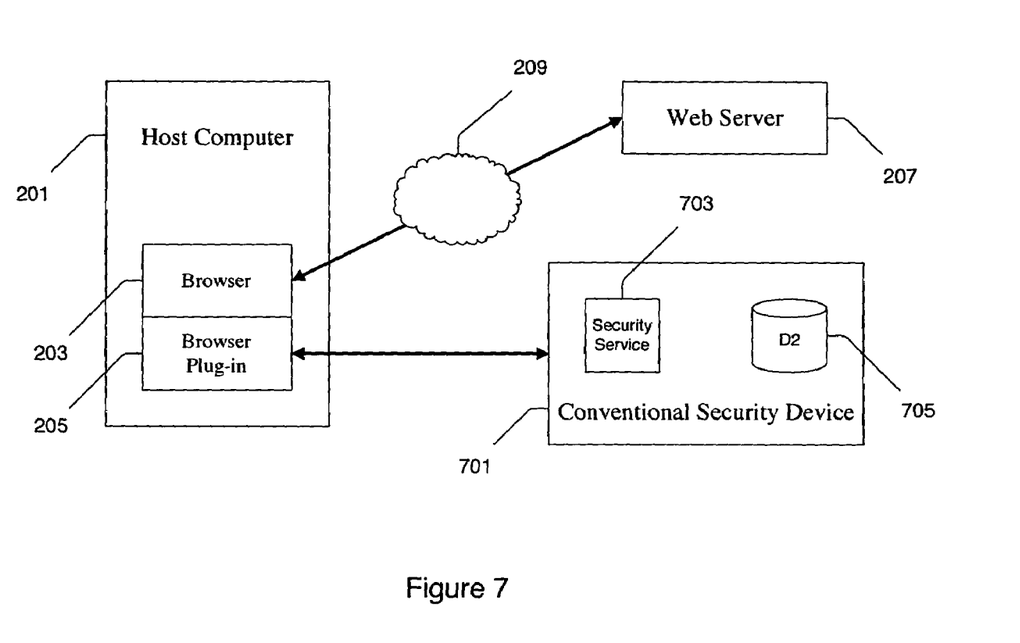
FIG. 7 is a schematic illustration of an example of a conventional security device for delegation of security context from a web server to a client application on a host computer wherein the network connection of the conventional security device is via the host computer.

Yet another alternate embodiment of the invention described herein relies on a security device that is a conventional smart card (i.e., a smart card that is plugged into a smart card reader attached to the host computer and interacts with applications on the computer through conventional middleware software components) and has no direct access to the network. The conventional smart card is plugged into a smart card reader attached to the host computer and interacts with applications on the computer through conventional middleware software components such as reader driver and Windows resource manager. FIG. 7 is a schematic illustration showing the host computer 201 providing the security device 701 connectivity to the network 209, generally, and the web server 207, specifically. The browser 203 on the host computer 201 acts as an enabler of the communication between the smart card 701 and the web server 207. The workflow outlined in FIG. 3 applies in its entirety in reference to all the message flow to achieve the delegation of the security context generated by the web server 207 to the host computer 201.

From the foregoing it will be appreciated that the method for authentication of a user on a host computer to a web server using a network security device provided by the present invention represents a significant advance in the art. The present invention provides a way for seamless delegation of a web server security context to a host computer. In addition, the browser plug-in on the host computer provides the required handshake with a network security device to receive the web server security context, which is otherwise not achievable in a traditional service-oriented network computer environment.

Although specific embodiments of the invention have been described and illustrated, the invention is not to be limited to the specific forms or arrangements of parts so described and illustrated. The invention is limited only by the claims.

We claim:

1. A method for authenticating a user on a host computer to a web server, comprising:
   establishing a secure communications channel between a plug-in operating on a host computer and a network security device;
   authenticating the user to the network security device;
   designating a web server to which a connection is desired from a browser operated by the user;
   establishing a connection between the network security device and the web server;
   establishing a security context by the web server;
   transferring the security context from the web server to the trusted network security device;
   transmitting the security context from the network security device to the plug-in;
   operating the plug-in to store the security context such that the security context may be retrieved by the browser;
   operating the browser to connect to the web server including transmitting the security context from the browser to the web server; and
   upon presentment of the security context, granting the user access to the services of the web server.

2. The method for authenticating a user on a host computer to a web server of claim 1 wherein the security context is a SAML Assertion.

3. The method for authenticating a user on a host computer to a web server of claim 1 wherein the network security device is a smart card.

4. The method for authenticating a user on a host computer to a web server of claim 3 comprises operating the smart card to secure communication with other computers on the network using a standard mainstream network communication protocol selected from TCP/IP and SSL/TLS.

5. The method for authenticating a user on a host computer to a web server of claim 3 wherein the network security device is a smart card and the smart card is a slave device of the host computer.

6. The method for authenticating a user on a host computer to a web server of claim 3 comprising operating the smart card to:
   establish network connection to the web server;
   acquire security context from the web server;
   delegate security context to the browser plug-in on the host computer thereby
   enable a user on the host computer to access resources on the web server.

7. The method for authenticating a user on a host computer to a web server of claim 1 comprises operating the network smart card to store a manufacturer issued X.509 certificate and the X.509 certificate is signed by a trusted Certificate Authority.

8. The method for authenticating a user on a host computer to a web server of claim 1 comprising operating the browser plug-in on the host computer to request the manufacturer issued X.509 certificate from the smart card; and
   in response to receiving the X.509 certificate:
      to authenticate the network smart card; and
      upon authenticating the smart card, to send the user credentials to the network smart card.

9. A method for authenticating a user on a host computer to a web server, comprising:
   establishing a security context by the web server;
   transferring the security context from the web server to a smart card;
   receiving the user credential from the browser plug-in on the host computer;
   authenticating the user on the host computer;
   establishing trust between the smart card and the browser plug-in;
   establishing a secure channel of communication between the network security device and the browser plug-in on a host computer; and
   authenticating the network security device by the browser plug-in on the host computer; and
   in response the network security device authenticating the user on the host computer; and
   establishing trust between the plug-in on the host computer and the network security device; and
   delegating security context to a browser plug-in on a host computer by transferring the security context to the plug-in on the host computer; and
   authenticating the user on the host computer to the web server using the security context.

10. The method for authenticating a user on a host computer to a web server of claim 9 comprises operating the browser plug-in on the host computer to:
  receive the delegated security context from the network smart card and;
  establish trust between the user on the host computer and the web server by using the security context; and
  to enable the user on the host computer to access resources on the web server.

11. A system for authenticating a user on a host computer to a web server, comprising:
  a security device connectable to the host computer;
  a browser plug-in having instructions executable on the host computer within the context of a browser, the browser plug-in comprising instructions to:
    establish a secure communications channel between a plug-in operating on a host computer and a network security device;
    authenticate the user to the network security device;
    designate a web server to which a connection is desired from a browser operated by the user;
  the security device having instructions to
    establish a connection between the security device and the web server;
    receive a security context from the web server to a security device; and
    transfer the security context to a browser plug-in on the host computer;
    transmitting the security context from the network security device to the plug-in;
  the browser plug-in further having instructions to:
    store the security context such that the security context may be retrieved by the browser;
  the web server having instructions to receive the security context from the browser; and
    upon presentment of the security context, to grant the user access to the services of the web server.

12. The system for authenticating a user on a host computer to a web server of claim 11 wherein the security context is a SAML Assertion.

13. The system for authenticating a user on a host computer to a web server of claim 11 wherein the security device is a smart card.

14. The system for authenticating a user on a host computer to a web server of claim 11 wherein the smart card comprises instructions to store a manufacturer issued X.509 certificate and the X.509 certificate is signed by a trusted Certificate Authority.

15. The system for authenticating a user on a host computer to a web server of claim 11 wherein the browser plug-in on the host computer comprises instructions to:
  request the manufacturer issued X.509 certificate from the smart card; and instructions to, in response to receiving the X.509 certificate, authenticate the smart card; and
  to send the user credentials to the smart card.

* * * * *